United States Patent
Haendel

(10) Patent No.: US 7,002,994 B1
(45) Date of Patent: Feb. 21, 2006

(54) MULTI-CHANNEL AUDIO DISTRIBUTION FOR AIRCRAFT PASSENGER ENTERTAINMENT AND INFORMATION SYSTEMS

(75) Inventor: Richard S. Haendel, Iowa City, IA (US)

(73) Assignee: Rockwell Collins, Cedar Rapids, IA (US)

( * ) Notice: Subject to any disclaimer, the term of this patent is extended or adjusted under 35 U.S.C. 154(b) by 1026 days.

(21) Appl. No.: 09/818,970

(22) Filed: Mar. 27, 2001

(51) Int. Cl.
*H04J 1/00* (2006.01)

(52) U.S. Cl. .................... 370/480; 370/486; 370/535; 725/74; 725/76

(58) Field of Classification Search ................ 370/206, 370/211, 270, 535, 537, 539, 540, 542, 541, 370/527, 529, 503, 434, 480, 536, 489, 486, 370/487, 490, 485, 533; 725/74, 75, 76, 725/77
See application file for complete search history.

(56) References Cited

U.S. PATENT DOCUMENTS

| | | | | |
|---|---|---|---|---|
| 3,873,777 A | * | 3/1975 | Uehara et al. ............. 370/477 |
| 4,567,591 A | * | 1/1986 | Gray et al. ................. 370/326 |
| 5,651,010 A | * | 7/1997 | Kostreski et al. ........... 370/537 |
| 5,953,429 A | * | 9/1999 | Wakai et al. ................. 381/77 |
| RE38,142 E | * | 6/2003 | Berry et al. .................. 725/77 |
| 2001/0021997 A1 | * | 9/2001 | Lee .............................. 725/74 |
| 2003/0217363 A1 | * | 11/2003 | Brady et al. ................. 725/76 |
| 2004/0098745 A1 | * | 5/2004 | Marston et al. ............... 725/73 |

* cited by examiner

Primary Examiner—Ajit Patel
(74) Attorney, Agent, or Firm—Nathan O. Jensen; Kyle Eppele

(57) ABSTRACT

A method of distributing audio channels to passengers of an aircraft includes digitally encoding a multiplicity of audio channels into a corresponding multiplicity of digital audio channels. Different groups of the digital audio channels are combined into sub-channels having a data rate higher than a data rate of the digital audio channels. The sub-channels are combined into a composite data stream having a data rate higher than the data rate of the sub-channels. A first radio frequency (RF) carrier signal is modulated with the composite data stream to generate a modulated RF signal audio output. The modulated RF signal output containing a large number of audio channels is transmitted over a data network, such as a coaxial cable network, along with a multiplicity of video channel modulated RF carrier signals.

17 Claims, 3 Drawing Sheets

MULTI-CHANNEL AUDIO DISTRIBUTION FOR AIRCRAFT PASSENGER ENTERTAINMENT AND INFORMATION SYSTEMS

FIELD OF THE INVENTION

The present invention relates to aircraft passenger entertainment and information systems. More particularly, the present invention relates to multi-channel audio distribution systems for use in aircraft.

BACKGROUND OF THE INVENTION

New aircraft cabin systems are providing a larger number of video channels for passenger entertainment and information. It is desirable for each passenger to be able to select a movie or other video/audio entertainment program, while selecting his or her individual choice of program start time. This requires at least one independent audio channel for each passenger on the aircraft. As a result, it is preferable that there be 300 or more independent audio channels available on an aircraft for passenger entertainment and information.

Currently, video distribution systems utilized on aircraft provide passenger television connectivity using a frequency division multiplex scheme, very similar to the scheme used in cable television distribution systems. In this frequency division multiplex scheme, each video channel is carried on a different radio frequency (RF) carrier, with the multiple RF carriers typically ranging between the frequencies of 60 MHz and up to 400 MHz or higher. Distribution of the video channels to passengers is usually accomplished using coaxial cables which carry the frequency division multiplexed video signals. A video tuner at each passenger location can be used to select a particular RF carrier in order to view the information of a particular video signal modulated on that RF carrier.

It is desirable to provide an audio distribution system capable of providing 300 or more independent audio channels, but which is compatible with these existing aircraft video distribution systems. However, modulating this large of a number of audio signals on RF carriers in the same manner that video signals are modulated and carried by RF carrier signals would require excessive bandwidth. Consequently, an audio distribution system which is compatible with present aircraft video distribution systems, but which provides a large number of audio channels without requiring excessive bandwidth, would be a significant improvement in the art.

SUMMARY OF THE INVENTION

A method of distributing audio channels to passengers of an aircraft includes digitally encoding a multiplicity of audio channels into a corresponding multiplicity of digital audio channels. Different groups of the digital audio channels are combined into sub-channels having a data rate higher than a data rate of the digital audio channels. The sub-channels are combined into a composite data stream having a data rate higher than the data rate of the sub-channels. A first radio frequency (RF) carrier signal is modulated with the composite data stream to generate a modulated RF signal audio output. The modulated RF signal output containing a large number of audio channels is transmitted over a data network, such as a coaxial cable network, along with a multiplicity of video channel modulated RF carrier signals.

DETAILED DESCRIPTION OF AN ILLUSTRATIVE EMBODIMENT

Figure 1:
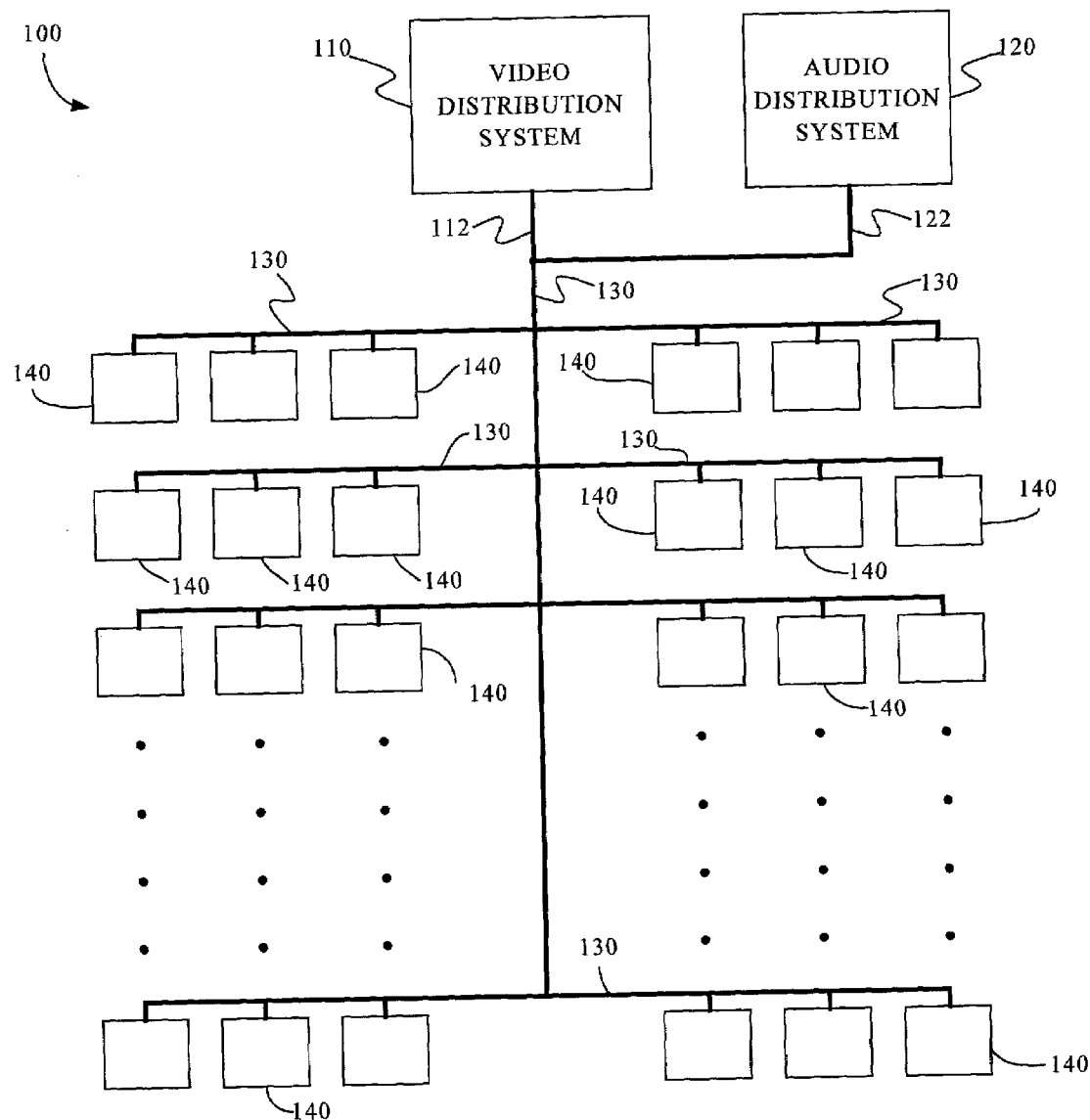
FIG. 1 is a diagrammatic illustration of an aircraft passenger entertainment and information system in accordance with embodiments of the present invention.

FIG. 1 is a diagrammatic illustration of an aircraft cabin passenger entertainment and/or information system 100 in accordance with embodiments of the invention. System 100 is used to supply video and audio channels to passenger monitors located at the passenger seats. Within system 100 is a conventional video distribution system 110 and a compatible audio distribution system 120 which functions in accordance with the present invention. Conventional video distribution system 110 uses frequency division multiplexed video transmission, such as the type frequently used in cable television distribution systems, to provide output 112. Output 112 contains a large number of video channels for passenger entertainment and information, where each video signal is carried on its own RF carrier signal, usually between the frequencies of 60 MHz and up to 400 MHz or higher. Frequency division multiplexed video output signal 112 containing the video channels is provided to passenger tuning and demodulation stations 140 via data network 130. Data network 130 can be implemented in a variety of different techniques. For example, data network 130 can be a series of coaxial cables. In another embodiment, data network 130 is a wireless wideband RF low power network. In this embodiment, data network 130 includes a wireless wideband low power RF transmitter coupled to, and/or included in, audio distribution system 120, as well as a plurality of wireless RF receivers, each located at individual passenger locations (stations 140). In this embodiment, each passenger can select a particular channel using the receiver in a manner similar to the use of television receivers.

A multiplicity of tuning and demodulation stations 140, each located at or associated with a passenger seat, are connected to coaxial cables 130 and used to retrieve the particular passenger's desired video channel from frequency division multiplexed video signal 112 which contains all of the video signals. Each station 140 has a tuner that selects the desired RF carrier, and a demodulator which demodulates the selected RF carrier and modulated signal to obtain the desired video channel. The desired video channel is then provided to a passenger display device.

In accordance with the present, system 100 also includes audio distribution system 120 which is compatible with the exiting video distribution system 110. Audio distribution system 120 provides a large number (generally 300 or more) of audio channels, typically at least one for each station 140. The multiplicity of audio channels are time division multiplexed and modulated on a single RF carrier. The audio signals modulated on the RF carrier are provided at output 122. Modulation of the large number of audio channels on a signal RF carrier allows audio distribution system 120 to utilize the same data network 130 to distribute the audio channels to tuning and demodulation stations 140. As will be described below in greater detail, stations 140 will have additional capabilities required for retrieving the audio channels which have been time division multiplexed and modulated on the single RF carrier.

Figure 2:
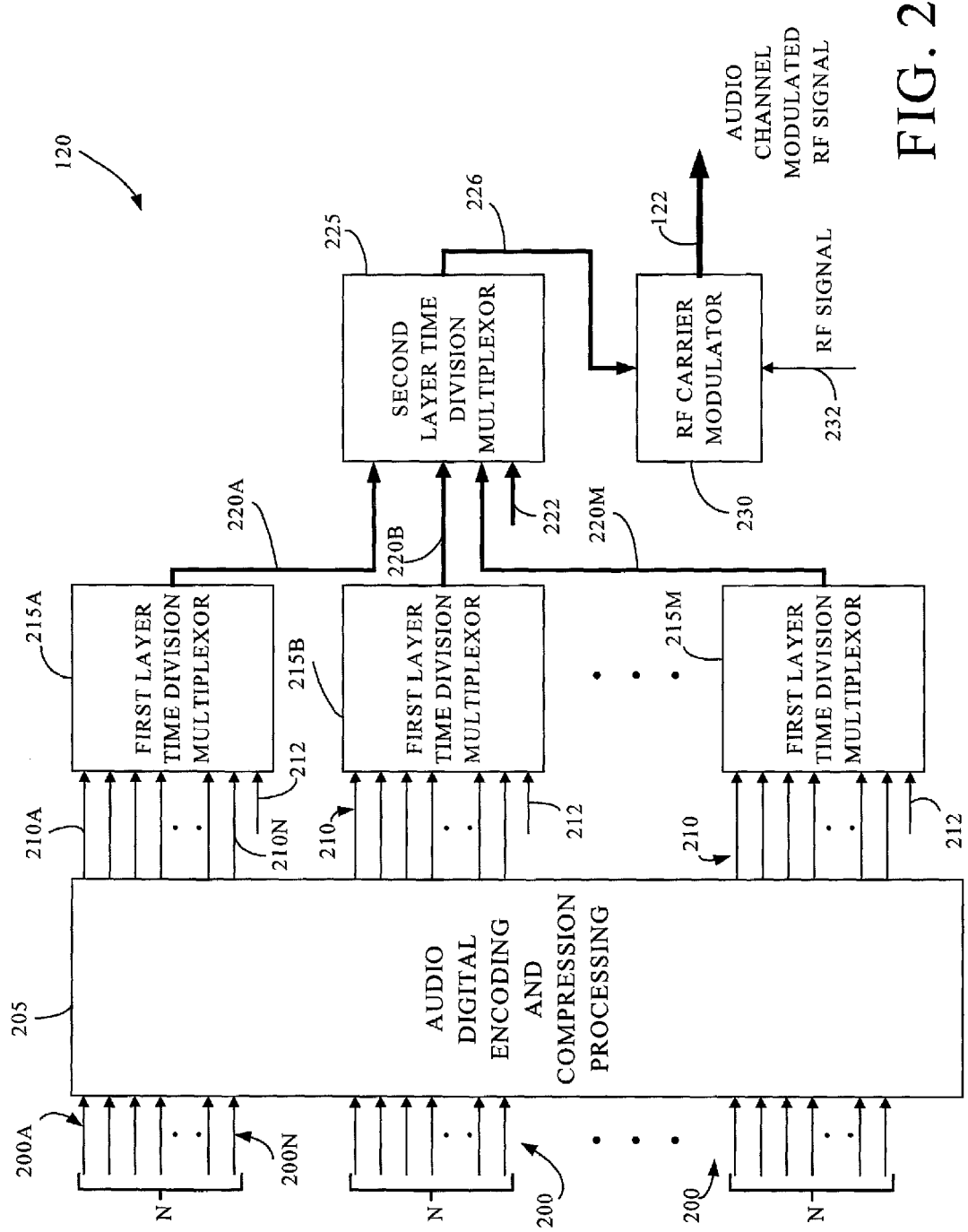
FIG. 2 is a block diagram illustrating an embodiment of the audio distribution system portion of the aircraft passenger entertainment and information system shown in FIG. 1.

FIG. 2 is a block diagram of audio distribution system 120 in accordance with embodiments of the present invention. In the example embodiment illustrated in FIG. 2, audio distribution system 120 includes audio digital encoding and compression processing circuitry 205, first layer time division multiplexers 215, second layer time division multiplexer 225, and RF carrier modulation circuitry 230.

Audio digital encoding and compression processing circuitry 205 can be a microprocessor, a digital signal processor, an application specific integrated circuit (ASIC), or other circuitry which is programmed, configured or adapted to digitally encode and compress a multiplicity (typically 300 or more) of audio channels 200. If audio channels 200 are in the form of analog signals, circuitry 205 can include analog-to-digital conversion circuitry as well. In one embodiment, M groups of N audio channels 200 (each designated audio channels 200A through 200N) are digitally encoded and compressed. The groups of digitally encoded and compressed signals are provided at outputs 210. For example, for each group 200A through 200N of audio channels, a group 210A through 210N of digitally encoded and compressed audio channels are provided. Thus, a total of N*M digitally encoded and compressed audio channels are provided by circuitry 205. It must be understood that representation of circuitry 205 encoding and compressing audio signals in M groups of N channels at a time is for illustrative purposes only, and that encoding and compressing of the N*M audio channels can occur one at a time, all at once, or in groups of varying sizes in other embodiments.

In one particular embodiment, circuitry 205 digitally encodes audio channels 200 using the Moving Picture Experts Group (MPEG) compression standard MPEG-2, layer 2 encoding at a data rate of 128 K bits per second. For descriptive purposes, each of encoded and compressed outputs 210 can be referred to as a digital audio channel. MPEG-2 layer 2 digitizing provides audio quality similar to FM stereo broadcasts. In other embodiments, other encoding and compression algorithms can be used instead.

Each group of N digital audio channels is combined together by a correspondence one of first layer time division multiplexors 215, along with one 128 Kbit/second synchronization/control channel 212, into a composite data stream 220 at a higher data rate. By way of example, in embodiments in which the number N is 31, each group of 31 digital audio channels are combined with one 128 Kbit/second synchronization/control channel 212 to make up a composite data stream of 32×128 Kbits/second or 4.096 Mbits/second. For descriptive purposes, this composite data stream 220 will be called a sub-channel. As illustrated in FIG. 2, there are M first layer time division multiplexers 215 (215A through 215M), resulting in M sub-channels 220 (220A through 220M).

Next, second layer time division multiplexer 225 combines the M sub-channels 220 together, along with a single high speed synchronization frame control channel 222, into a single high speed composite data stream 226. In an example embodiment in which the number N of digital audio channels 210 in each sub-channel 220 is 31, and in which the number M of sub-channels 220 in high speed composite data stream 226 is 15, the composite data stream contains 465 (15*31) digital audio channels. In this embodiment, with 15 each of the 4.096 Mbits/second sub-channels combined 220 together, along with the single high speed 4.096 Mbits/second synchronization frame control channel 222, the single high speed composite data stream 226 has a data rate of 65.54 (16×4.096) Mbit/second.

Using RF carrier modulator circuitry 230, composite high speed data stream 226 modulates an RF carrier signal 232 to provide a modulated RF signal output 122. In one embodiment, high speed composite signal 226 modulates RF signal 232 using 256 QAM (Quadrature Amplitude Modulation) modulation, which has an RF bandwidth of 8 bits/Hz. Therefore, the composite RF carrier would have an RF bandwidth of 65.54/8 bits/Hz, or 4.10 MHz. This bandwidth is less than the 6 MHZ spacing normally allocated for television RF carriers. If there should be some interference to other signals, then the RF spacing between the composite RF carriers can be made 8 MHz apart. Other bandwidth efficient modulation schemes may be used as well and implemented by circuitry 230.

The output 122 of circuitry 230 is a single RF carrier containing N×M (e.g., 31*15=465) digital audio channels. The RF modulated carrier signal 122 is then distributed throughout the cabin to individual seats using the same data network 130 used by video distribution system 110. As will be discussed below with reference to FIG. 3, each seat has a station 140 containing a tuner and demodulator that selects the RF carrier signal(s) from audio modulated RF carrier signal 122 and the multiplicity of video modulate RF carrier signals 112. Channel decoding using time synchronization derived from the synchronization and control frames built into the data stream (in synchronization frame control channels 222 and 212) as discussed above. The individual decoder for a particular station 140 selects the passenger's desired sub-channel 220 and digital audio channel 210. Once the desired digital audio channel 210 is obtained, station 140 converts the MPEG (or other encoding and compression format) digitized audio back into an audio signal of a desired format. The audio signal can then be provided to an audio system for use by the passenger.

Figure 3:
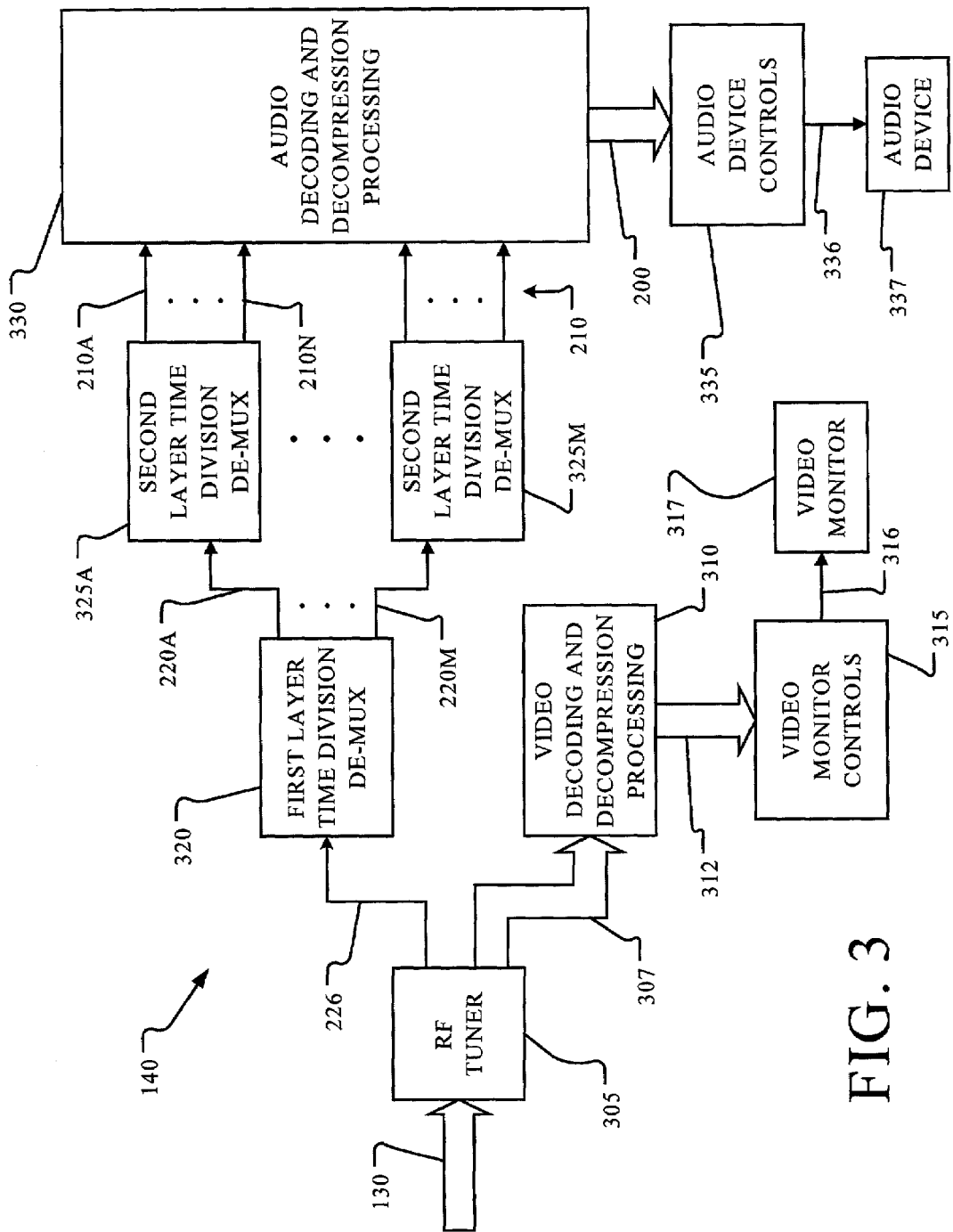
FIG. 3 is a block diagram illustrating an embodiment of a tuning and demodulation station of the type which can be positioned at, or associated with, each passenger seat.

FIG. 3 is a block diagram illustrating one embodiment of a tuning and demodulation station 140, which can be positioned at or associated with each passenger seat. Each station 140 includes an RF tuner 305 which receives the multiplicity of modulated RF carrier signals (containing audio channel modulated signal 122 and multiple video channel RF signals 122). The RF tuner isolates individual modulated RF carrier signals and demodulates the isolated signals to retrieve the audio or video signal used to modulate the particular carrier. In other words, RF tuning and demodulation circuitry provides as an output high speed composite data stream 226 (FIG. 2) and a multiplicity of video channels or signals 307.

As in a conventional passenger station, station 140 can include video decoding and decompression processing circuitry or programming which decodes and/or decompresses a passenger selected individual video signal to obtain a video signal 312 which can be provided to video monitor controls 315. For example video decoding and decompression processing circuitry 310 can be processing circuitry programmed to retrieve a video signal 312 using MPEG formatting and algorithms. Video monitor controls 315 then provide control signals 316 to control a video monitor 317 to display desired programming.

Station 140 also includes first layer time division de-multiplexer 320 and second layer de-multiplexers 325A through 325M. De-multiplexer 320 uses the high speed synchronization frame control channel 222 (FIG. 2) embedded within composite data stream 226 to convert data stream 226 back into sub-channels 220A through 220M, which were described above with reference to FIG. 2. Each of sub-channels 220 is fed into one of second layer time division de-multiplexers 325. Using the high speed synchronization frame control channel 212 (FIG. 2) embedded within each of sub-channels 220, the second layer de-multiplexers convert each sub-channel 220 back into N digitally encoded and compressed audio signals 210.

Audio decoding and decompression processing circuitry 330 can be a microprocessor, a digital signal processor, an ASIC, or other circuitry which is programmed, configured or adapted to digitally decode and/or decompress all or a selected one of the multiplicity of audio channels 200. In a typical embodiment, circuitry 330 selects the desired audio channel 210 and converts the MPEG digitized audio signal back into an analog signal 200 which is provided to audio device controls 335. Audio device controls 335 then generates control signals 336 for controlling audio device 337, which can be speakers, headphones or other types of audio devices.

Although the present invention has been described with reference to illustrative embodiments, workers skilled in the art will recognize that changes may be made in form and detail without departing from the spirit and scope of the invention. For example, the particular modulation and data compression techniques described above are provided as examples only, and the invention is not limited to those particular techniques. Similarly, the invention is not limited to the specific data rates discussed.

What is claimed is:

1. A passenger entertainment system for use in distributing audio and video channels to passenger entertainment stations on an aircraft, the passenger entertainment system comprising:
   a data network on the aircraft;
   a video system on the aircraft which modulates each of a plurality of video channels on one of a plurality of different radio frequency (RF) carrier signals, and which transmits the plurality of video modulated RF carrier signals to the passenger entertainment stations over the data network;
   digital encoding circuitry on the aircraft configured to receive a multiplicity of audio channels and to digitally encode each of the multiplicity of audio channels to thereby provide a multiplicity of digital audio channels;
   first layer time division multiplexers on the aircraft each receiving a different plurality of the multiplicity of digital audio channels as inputs, wherein each of the first layer time division multiplexers combines its corresponding plurality of digital audio channels with a synchronization and control channel into a single sub-channel having a data rate higher than a data rate of the digital audio channels;
   a second layer time division multiplexer on the aircraft receiving as inputs the sub-channels from each of the first layer time division multiplexers, wherein the second layer time division multiplexer combines the sub-channels with a synchronization and control channel into a composite data stream having a data rate higher than the data rate of the sub-channels; and
   modulation circuitry on the aircraft coupled to the second layer time division multiplexer and to the data network, the modulation circuitry modulating a first RF carrier signal with the composite data stream to generate an audio modulated RF carrier signal and transmitting the audio modulated RF carrier signal over the data network with the plurality of video modulated RF carrier signals from the video system.

2. The passenger entertainment system of claim 1, wherein the data network comprises coaxial cables coupled to the passenger entertainment stations.

3. The passenger entertainment system of claim 1, wherein the data network comprises a wireless wideband RF low power transmitter and a plurality of receivers, each located at individual passenger locations.

4. The passenger entertainment system of claim 1, wherein the digital encoding circuitry is further configured to digitally compress each of the multiplicity of audio channels to thereby provide the multiplicity of digital audio channels.

5. The passenger entertainment system of claim 4, wherein the digital encoding circuitry is configured to digitally encode and compress the audio channels into a Moving Picture Experts Group (MPEG) format.

6. The passenger entertainment system of claim 5, wherein the digital encoding circuitry is configured to digitally encode and compress the audio channels using MPEG-2, layer 2 encoding at a data rate of approximately 128 Kbits per second.

7. The passenger entertainment system of claim 6, wherein each of the first layer time division multiplexers is configured to combine approximately 31 digital audio channels and a 128 Kbits per second synchronization and control channel into the single sub-channel at a data rate of approximately 4.096 Mbits per second.

8. The passenger entertainment system of claim 7, wherein the second layer time division multiplexer is configured to combine approximately 15 sub-channels and a 4.096 Mbits per second synchronization and control channel into the composite data stream at a data rate of approximately 65.44 Mbits per second, the composite data stream containing data corresponding to the number of digital audio channels in the approximately 15 sub-channels of approximately 31 digital audio channels.

9. The passenger entertainment system of claim 8, wherein the modulation circuitry modulates the first RF carrier signal using 128 QAM modulation.

10. A method of distributing audio channels to passengers of an aircraft, the method comprising:
   digitally encoding a multiplicity of audio channels into a corresponding multiplicity of digital audio channels;
   combining each of different pluralities of the digital audio channels in the multiplicity of digital audio channels into a different sub-channel having a data rate higher than a data rate of the digital audio channels;
   combining the different sub-channels into a composite data stream having a data rate higher than the data rate of the sub-channels;
   modulating a first radio frequency (RF) carrier signal with the composite data stream to generate an audio modulated RF carrier signal;
   modulating each of a plurality of video channels on a different one of a plurality of RF carrier signals to generate a plurality of video modulated RF carrier signals; and
   transmitting the audio modulated RF carrier signal and the plurality of video modulated RF carrier signals to passenger entertainment stations on the aircraft over a data network on the aircraft, the data network coupling audio and video modulating circuitry on the aircraft to the passenger entertainment stations.

11. The method of claim 10, and further including audio channel distributing steps comprising:
- selecting the audio modulated RF carrier signal using an RF tuner coupled to the data network and associated with a particular passenger location;
- demodulating the audio modulated RF carrier signal to obtain the composite data stream;
- separating the composite data stream into the different sub-channels;
- separating the different sub-channels into the different pluralities of the digital audio channels; and
- converting a selected digital audio channel into an audio signal.

12. The method of claim 11, and further comprising providing the audio signal to audio device controls associated with an audio device associated with the particular passenger location.

13. The method of claim 12, wherein digitally encoding the multiplicity of audio channels into the corresponding multiplicity of digital audio channels further comprises digitally compressing each of the multiplicity of audio channels to thereby provide the multiplicity of digital audio channels.

14. The method of claim 13, wherein digitally encoding and compressing the audio channels further comprises converting the audio channels into a Moving Picture Experts Group (MPEG) format.

15. The method of claim 14, wherein converting the audio channels into the MPEG format further comprises digitally encoding and compressing the audio channels using MPEG2, layer 2 encoding at a data rate of approximately 128 Kbits per second.

16. The method of claim 15, wherein combining each of the different pluralities of the digital audio channels into different sub-channels further comprises combining approximately 31 digital audio channels and a 128 Kbits per second synchronization and control channel into single sub-channels at a data rate of approximately 4.096 Mbits per second.

17. The method of claim 16, wherein combining the different sub-channels into a composite data stream further comprises combining approximately 15 sub-channels and a 4.096 Mbits per second synchronization and control channel into the composite data stream at a data rate of approximately 65.44 Mbits per second, the composite data stream containing data corresponding to the number of digital audio channels in the approximately 15 sub-channels of approximately 31 digital audio channels.

* * * * *